(12) United States Patent
Chen (10) Patent No.: US 11,774,196 B2
(45) Date of Patent: Oct. 3, 2023

(54) HEAT EXCHANGE SYSTEM HAVING DESIRED ANTI-SCALING PERFORMANCE AND AN ANTI-SCALING METHOD THEREOF

(71) Applicant: Chu-Fu Chen, Taipei (TW)

(72) Inventor: Chu-Fu Chen, Taipei (TW)

( * ) Notice: Subject to any disclaimer, the term of this patent is extended or adjusted under 35 U.S.C. 154(b) by 0 days.

(21) Appl. No.: 16/421,448

(22) Filed: May 23, 2019

(65) Prior Publication Data

US 2019/0360769 A1 Nov. 28, 2019

(30) Foreign Application Priority Data

May 23, 2018 (TW) .................................. 107117591

(51) Int. Cl.
| | |
|---|---|
| F28F 19/00 | (2006.01) |
| F28F 19/01 | (2006.01) |
| F24D 19/00 | (2006.01) |
| F28G 15/00 | (2006.01) |
| F28G 9/00 | (2006.01) |

(52) U.S. Cl.
CPC ............ *F28G 15/003* (2013.01); *F28F 19/01* (2013.01); *F28G 9/00* (2013.01); *F28F 2200/00* (2013.01)

(58) Field of Classification Search
CPC ........ F28F 19/00; F28F 19/002; F28F 19/004; F28F 19/01; F28F 19/02; F28F 2200/00; F28G 9/00; F28G 15/003; F24D 19/0092; C02F 2209/10; C02F 2209/055; C02F 5/02

USPC ............................................ 165/303, 95, 119
See application file for complete search history.

(56) References Cited

U.S. PATENT DOCUMENTS

| | | | |
|---|---|---|---|
| 4,153,559 A | 5/1979 | Sanderson | |
| 4,366,053 A | 12/1982 | Lindler | |
| 4,505,815 A | 3/1985 | Lindler | |
| 5,060,600 A * | 10/1991 | Brown | ..................... F28B 11/00 122/504 |

(Continued)

FOREIGN PATENT DOCUMENTS

| | | |
|---|---|---|
| CN | 104374870 | 2/2015 |
| CN | 104502556 | 4/2015 |

(Continued)

*Primary Examiner* — Frantz F Jules
*Assistant Examiner* — Jason N Thompson
(74) *Attorney, Agent, or Firm* — Birch, Stewart, Kolasch & Birch, LLP (57) ABSTRACT

A heat exchange system having desired anti-scaling performance and an anti-scaling method thereof are disclosed. The heat exchange system at least comprises a load control unit, a temperature and pressure detection unit and an anti-scaling treatment unit. The heat exchange system conditions bonding ways of water quality in a HVAC chiller unit, an air compressor, a heat exchanger, a cooling unit, or a boiler under a variety of scaling conditions in both field operation and water quality, by integrating the interaction of those units together with the anti-scaling method for simulating water quality that has a water quality limit same as that in field operation. The heat exchange system further integrates with a testing of anti-scaling performance to make water quality no longer charged and lose the reaction power so as to prevent scaling formation, enhance the anti-scaling performance, and ensure operating efficiency and performance.

15 Claims, 9 Drawing Sheets

(56) References Cited

U.S. PATENT DOCUMENTS

| | | | | |
|---|---|---|---|---|
| 5,215,704 | A * | 6/1993 | Hirota | F28F 19/00 374/39 |
| 2006/0020420 | A1* | 1/2006 | Vesel | F28F 27/00 702/182 |
| 2007/0108056 | A1* | 5/2007 | Nyberg | C02F 1/4695 204/554 |
| 2008/0237138 | A1* | 10/2008 | Moore | C02F 5/025 210/713 |
| 2010/0155312 | A1* | 6/2010 | Numata | F24D 19/0092 210/96.1 |
| 2015/0047973 | A1* | 2/2015 | Yoshida | C02F 1/46104 204/239 |
| 2016/0221849 | A1* | 8/2016 | Charlesworth | C02F 1/66 |

FOREIGN PATENT DOCUMENTS

| | | |
|---|---|---|
| CN | 107055821 | 8/2017 |
| TW | M279636 | 11/2005 |
| TW | M462272 | 9/2013 |

\* cited by examiner

HEAT EXCHANGE SYSTEM HAVING DESIRED ANTI-SCALING PERFORMANCE AND AN ANTI-SCALING METHOD THEREOF

BACKGROUND OF THE INVENTION

1. Field of the Invention

The present invention relates generally to a heat exchange system and an anti-scaling method thereof and in particular to a heat exchange system having desired anti-scaling performance and an anti-scaling method thereof, applying to a HVAC chiller unit (including a refrigeration and freezing equipment, a packaged chiller unit, a chiller unit, a brine chiller unit, a heat pumps and so on), an air compressor, or a boiler, by using transportation of chilled water and brine water or refrigerant, a wastewater treatment device, an air conditioning equipment, an industrial furnace and so on, to ensure the operating efficiency and performance in field operation.

2. Related Art

A heat exchanger is used to transfer heat from a high temperature side to a low temperature side via a pump by which the heat can be effectively taken away from the high temperature side or associated with the production of steam and hot water via heating. At present, heat exchangers are equipped in many different kinds of heating, ventilation and air conditioning (HVAC) chiller units, air compressors and boilers for taking away produced heat during operation, or producing steam and hot water via heating. However, the heat exchanger of the HVAC chiller unit, the air compressor or the boiler comes with a scaling (or fouling) problem while proceeding heating and cooling operations based on thermal exchange principle. In details, for the HVAC chiller unit or the air compressor, water pipes for heat exchange of cooling water are configured as an indispensable component, responsible for outputting the cooling water to contact with the air to achieve a heat emission or a cooling effect. On the other hand, factors that influence makeup water hardness, together with air-borne-solids, organics, microbial particles, etc., keep entering the cooling water causing scaling formation at normal temperature (about 10-50° C.) with the presence of calcium ions and bicarbonate ions in water. One factor for scaling formation is the existence of calcium carbonate that consists of the carbonate ions dissociated from bicarbonate ions ($HCO_3^-+OH^-\rightarrow H_2O+CO_3^{-2}$) and the calcium ions, and will readily impede heat exchange in course of time and thus decrease heat dissipation of the HVAC chiller units and the air compressors. For the pipe of the boiler, scaling formation happens when water is evaporated and concentrated under high temperatures (100~200° C.). The formed scale consists of calcium carbonate crystals which would readily impede heat exchange in course of time. As above, the HVAC chiller units, the air compressors and the boilers that process heating and cooling operations based on thermal exchange principle, are subject to scaling formation under the influence of the ambient environment and temperature in course of time, resulting in the decrease of the operating performance and efficiency. Likewise, heat exchangers for wastewater treatment, transportation of chilled or brine water, or refrigerant, air conditioning machines, industrial furnaces, or other kind of heat exchangers or coolers are also subject to scaling formation under the influence of the ambient environment and temperature in course of time, resulting in the decrease of the operating performance and efficiency.

To prevent the scaling formation aggressively, there are a number of related patents such as in Taiwan patent No. TW M279636, utilizing frequency-change electric magnetic field to destruct combination between calcium and magnesium ions and carbonate ions; in Taiwan patent No. TW M436496, reducing the impurities in the water by filtration and refinement to prevent scaling formation and achieve water purification effect; in Taiwan patent No. TW M470846, decomposing into cations and anions by electric shock to remove scale, rust, calcium carbonate and bacteria in water pipes; in Taiwan patent No. TW M509221, using electric appliances to adsorb scale; in Taiwan patent No. TW M517196, using magnetic rods to initiate magnetization for removal of scale in the water; and U.S. Pat. Nos. 4,153,559, 4,366,053, 4,505,815, etc. are other similar examples. However, those patents only provide related structures as partial solutions to water scaling problems, without further combining with the object to which they apply, such as the HVAC chiller units, the air compressors and the boilers, to ensure the operating performance and efficiency. Furthermore, as the trend in the world of energy conservation and carbon dioxide emission reduction, CNS Standard 12575 states the temperature of the cooling water as 10~50° C. CNS Standard 2144 states the operation and maintenance of boilers. CNS Standard 10231 states that a standard for boiler water supply and boiler water quality regulates boiler operation conditions at high, medium and low temperatures, e.g. 100~200° C. for steam boilers, 45~100° C. for hot water boiler, and that in field operation, an annual EER of the HVAC chiller unit and an efficiency requirement of the boiler should be within certain ranges, for which related sellers should be responsible for monitoring changes of running load during operations and proposing corresponding solutions. Although above patents provide related structures and declare the water scaling problems can be solved, they only describe them in the patent specification theoretically and skillfully, rather than showing results of practical tests under various climates and running loads of operation conditions in the commercial contracts. Therefore, whether the above prior arts actually have anti-scaling effect is not yet clear. Therefore, the anti-scaling performance has never been tested by sellers of each professional field (e.g. professional field of the HVAC chiller unit, air compressor, boiler, chemical engineering or water treatment). Because of difference of independent professional fields, sellers of each professional field dare not to try to test the anti-scaling performance. Thus, there is no way to know or ensure operating performance and efficiency of the equipment to which they apply (e.g. the HVAC chiller unit, the air compressor and the boiler). In other words, sellers of anti-scaling treatment device in Taiwan usually neither belong to the field of chemical engineering, nor to the field of air conditioning, air compressor and boiler. To determine the scaling degree on pipes of the HVAC chiller unit, the air compressor and the boiler, they used to take a visual inspection. However, the visual inspection is very time-consuming (e.g. about taking 3~6 months or even 1 year) and cannot determine the scaling degree precisely so that most owners cannot accept it. Water treatment technology vendors of chemical fields and chemical plants often use small-type heat exchangers to test the anti-scaling performance. However, because of their doubt on the performance of the anti-scaling treatment device tested by heat exchangers, they do not use or sell the anti-scaling treatment device at all. Thus, the anti-scaling treatment device and the HVAC chiller unit, air compressor, boiler are separately sold by their sellers respectively. So far, they are not integrated. Further, in an improvement case, sellers of anti-scaling treatment device would directly get in touch with the owners for discussion of purchasing, selling affairs and installations, and sellers of anti-scaling treatment device only care about the pipe diameter of the HVAC chiller units during actual installation, instead of the anti-scaling performance, which is not helpful in integration of the anti-scaling treatment device and the HVAC chiller units, air compressors, boilers. Therefore, anti-scaling performance evaluation can hardly be achieved. Briefly, sellers of anti-scaling treatment device never show numerical results of the anti-scaling performance to avoid not meeting the acceptance criteria and cause the failure to pass examination. Similarly, the anti-scaling performance is never listed for the HVAC chiller units, air compressors and boilers. As in a building project, professional engineers of HVAC who are in charge of design and supervision and project contractors who are in charge of construction works never provide numerical results as a basis for evaluation of the anti-scaling performance either. Such a business model can never achieve energy-saving and carbon dioxide emission reduction purpose.

SUMMARY OF THE INVENTION

An object of the present invention is to provide a heat exchange system having desired anti-scaling performance. The heat exchange system is integrated and applied to a condenser of a HVAC chiller unit, an air cooler and an oil cooler of an air compressor, a heat exchanger, a cooling unit, or pipes of a boiler, to condition a scaling factor (such as calcium carbonates of heat-dissipated cooling water or heated hot boiler water), that is, to condition bonding ways of calcium ions and the carbonate ions of the calcium carbonates to produce molecular prototype with no longer charged and losing their reaction power so as to prevent scaling formation, enhance the anti-scaling performance, and ensure operating efficiency and performance of the HVAC chiller unit, the air compressor, the heat exchanger, the cooling unit, or the boiler, in order to solve the problem of being not successful in industry due to the lack of industrial applicability. In this regard, the heat exchange system of the present invention provides conditioning to the bonding ways between the calcium ions and the carbonate ions as a key technology that successfully overcomes said problem.

Another object of the present invention is to provide an anti-scaling method of the heat exchange system. The anti-scaling method improves non-fully treated anti-scaling treatment until the HVAC chiller unit, the air compressor, the heat exchanger, the cooling unit, or the boiler in field operation has been fully treated, i.e. 100% performance of scale inhibition, by simulating water same as that in field operation and testing an anti-scaling performance by a fast anti-scaling performance testing method with further conditioning and integration.

Another object of the present invention is to provide a one-stop service for the heat exchange system. This avoids that users who purchase in scattering or in batches still cannot purchase the heat exchange system of high operating efficiency and performance, and avoids being troubled in scaling problems due to the lack of skills in telling good from bad anti-scaling water treatment and integration thereof.

Another object of the present invention is to provide a fast anti-scaling performance testing method to replace conventional slow and rough identification, or simply no testing. The anti-scaling performance of the present invention comes out through a rapid testing in a period of approximate 3-8 hours, so as to provide users to set up suitable anti-scaling performance rate on their own, or alternatively the function of the anti-scaling performance may be taken into account at the time designing the heat exchange system.

To achieve this, a heat exchange system in accordance with the present invention is disposed on a condenser of a HVAC chiller unit, an air cooler and an oil cooler of an air compressor, a heat exchanger, a cooling water pipe of a cooling unit, or pipes of a boiler. The heat exchange system at least comprises a load control unit, a temperature and pressure detection unit, and an anti-scaling treatment unit. The load control unit is used to control a field operation of the condenser, the air cooler or the oil cooler, the boiler, or every kind of the heat exchanger and cooling equipment to satisfy predetermined conditions such as chilled water and brine water output temperature, air pressure, temperature and pressure at the heat source side, cooling water temperature, or steam pressure or hot water temperature of the boilers. The temperature and pressure detection unit is used to detect in every moment the temperature and pressure of the condenser, the air cooler or the oil cooler, the boiler (including a steam boiler and a hot water boiler), the heat exchanger and the cooling unit in field operation. The anti-scaling treatment unit is used to simulate water quality that has a water quality limit same as that in field operation to condition water in the condenser, the air cooler or the oil cooler, the heat exchanger and the cooling unit and water in the boiler (such as the steam boiler and the hot water boiler) and to condition a scaling factor of the cooling water in the condenser, the air cooler or the oil cooler, the heat exchanger and the cooling unit and the water in the boiler (steam boiler and the hot water boiler). The scaling factor may be bonding ways between calcium ions and carbonate ions of calcium carbonates in water. The anti-scaling treatment unit is integrated and applied to the HVAC chiller unit, the air compressor, the heat exchanger, the cooling unit, or the boiler by taking advantage of an anti-scaling treatment device that has been checked by the anti-scaling performance test, so that the heat exchange system can achieve a desired anti-scaling performance after applied to the HVAC chiller unit, the air compressor, the heat exchanger, the cooling unit, or the boiler.

Accordingly, conditioning of the water in the condenser, the air cooler or the oil cooler, the heat exchanger and the cooling unit and of the water in the pipe of the boiler (i.e. in the steam boiler and the hot water boiler) refers to conditioning different designed flow rate and water quality, that is, high temperature water is used in the boiler and low temperature water is used in the HVAC chiller unit and the air compressor. When a steam boiler is in operation, softened water is used and 80-120 percent of a feedwater flow or 150-300 percent of a steam capacity is taken as a treatment flow; when a hot water boiler is in operation, semi-softened water or water having hardness lower than 200 ppm of calcium carbonate is used, and 10-80 percent of the feedwater flow or a flow modified according to water quality or a number equal to total water quantity divided by 1-24 hours is taken as the treatment flow. When the HVAC chiller unit, the air compressor, the heat exchanger and the cooling unit are in operation with the hardness of makeup water lower than 200 ppm, 1-40 percent of the feedwater flow is taken as the treatment flow or the flow modified according to water quality. If the hardness of makeup water is higher than 200 ppm, the formula is used in the conditioning: treatment flow*(calcium carbonate amount in makeup water hardness/200 ppm). A formula of circulating water flow rate is "tonnage of HVAC chiller unit*12.5 L/m/RT", wherein the 12.5 L/m/RT has been normalized in the CNS Standard 12575, and the RT is tonnage of refrigeration which is calculated by converting heat dissipating capacity of 3900 kcal/h/RT.

Accordingly, the anti-scaling treatment unit in use of the anti-scaling method is integrated and applied to the HVAC chiller unit, the air compressor, the heat exchanger, the cooling unit, or the boiler is to condition cooling water at the cycle of concentration for the HVAC chiller unit, the air compressor, the heat exchanger or the cooling unit. The cycle of concentration depends on makeup water and water quality limit. A formula for calculating the cycle of concentration is the water quality limit divided by the electrical conductivity of makeup water. A formula of the circulating water flow rate is as follows: makeup water flow rate $M=nE/(n-1)$; bleed-off water flow rate $B=E/(n-1)$; wherein n is the cycle of concentration; E is evaporation flow rate that is a function of the tonnage of the HVAC chiller unit and can be calculated by dividing 3900 kcal/h/RT (i.e. the heat dissipating capacity of the cooling tower) by 580 kcal/kg (water vaporization heat at 30° C.).

Accordingly, the heat exchange system further includes a data processing unit. The data processing unit includes a memory, a microprocessor and an editing interface. The memory stores data processed by the load control unit and the temperature and pressure detection unit. The data consists of field operating factors and simulated factors. The field operating factors include steam pressures, hot water temperatures, load conditions, cooling water quality, makeup water rate and bleed-off water rate, running EER (Energy Efficiency Ratio; hereinafter referred to as EER) for different temperatures, and energy consumption. The simulated factors include simulated water quantity and water quality that has water quality limit same as that in field operation, wherein the water quality limit is defined by concentration of calcium ions and carbonate ions. The microprocessor compares and calculates the field operating factors processed by the load control unit and the temperature and pressure detection unit and the simulated factors (i.e. concentration of calcium ions and carbonate ions same as that in field operation) prestored in the memory, and shows results on terminal screens. The editing interface is compatible with an external operation panel and provides output and input of the data.

Accordingly, the anti-scaling method of the heat exchange system of the present invention includes presetting operating conditions of a HVAC chiller unit, an air compressor, a heat exchanger, a cooling unit or a boiler as operated water quality that has a water quality limit; simulating water quantity and water quality of the HVAC chiller unit, the air compressor, the heat exchanger, the cooling unit, or the boiler in field operation; processing a anti-scaling treatment based on water quantity and water quality (i.e. concentration of calcium ions and carbonate ions) of the HVAC chiller unit, the air compressor, the heat exchanger, the cooling unit, or the boiler simulated from that in field operation; testing an anti-scaling performance by a fast anti-scaling performance testing method; for the anti-scaling treatment non-fully treated, keeping conditioning and performance test until the anti-scaling treatment of the HVAC chiller unit, the air compressor, the heat exchanger, the cooling unit, or the boiler has been fully treated in field operation and no more scaling formation has been found (i.e. reaching 100% performance of scale inhibition); and finally, integrating an anti-scaling treatment device that has been checked by the anti-scaling performance test, with the HVAC chiller unit, the air compressor, the heat exchanger, the cooling unit, or the boiler to provide a heat exchange system of the HVAC chiller unit, the air compressor, the heat exchanger, the cooling unit, or the boiler with the anti-scaling performance so as to prevent scaling formation during heat exchanging process, and enhance operating efficiency and performance on the HVAC chiller unit, the air compressor, the heat exchanger, the cooling unit, or the boiler.

DESCRIPTION OF THE INVENTION

Figure 1A:
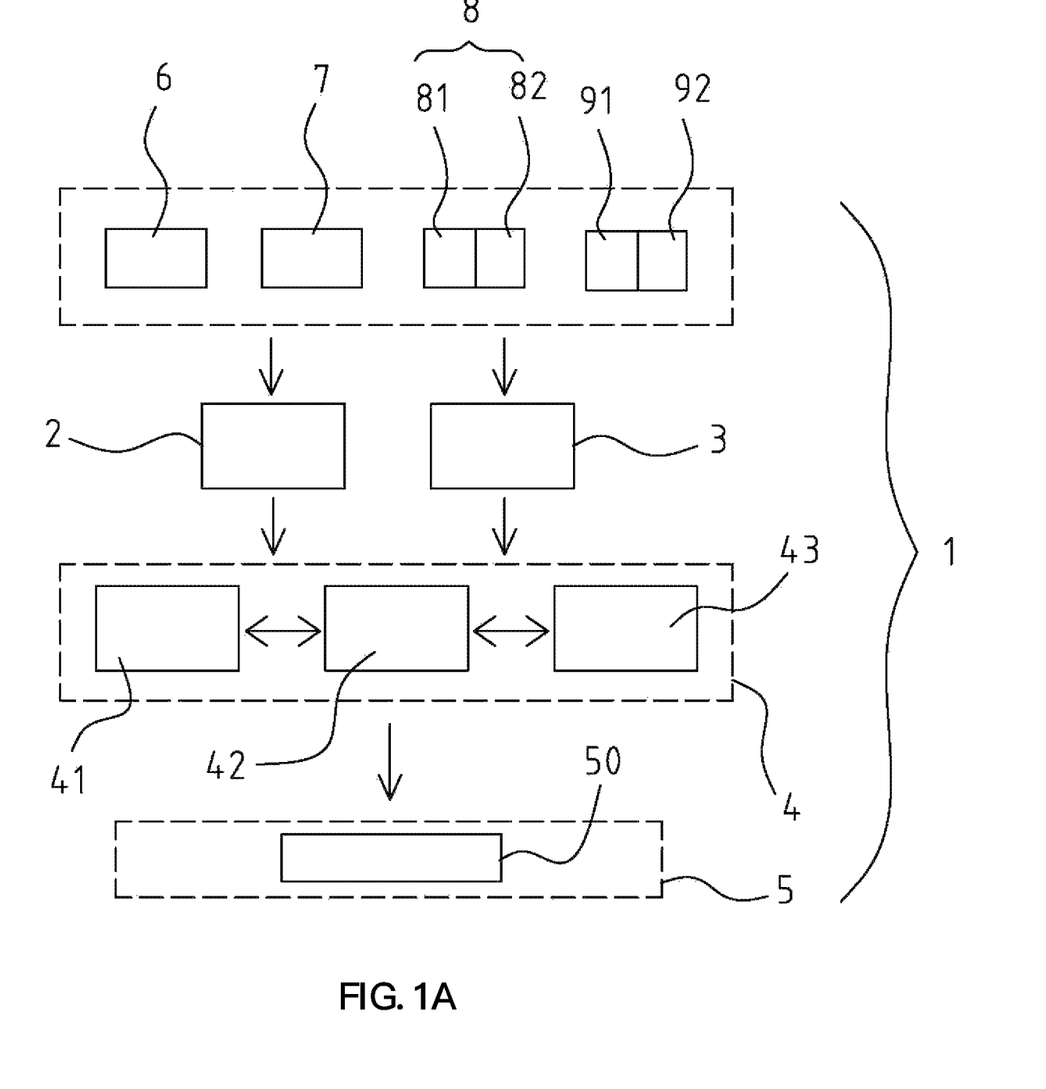
FIG. 1A and FIG. 1B are block diagrams showing a heat exchange system in accordance with the present invention.
Figure 1B:
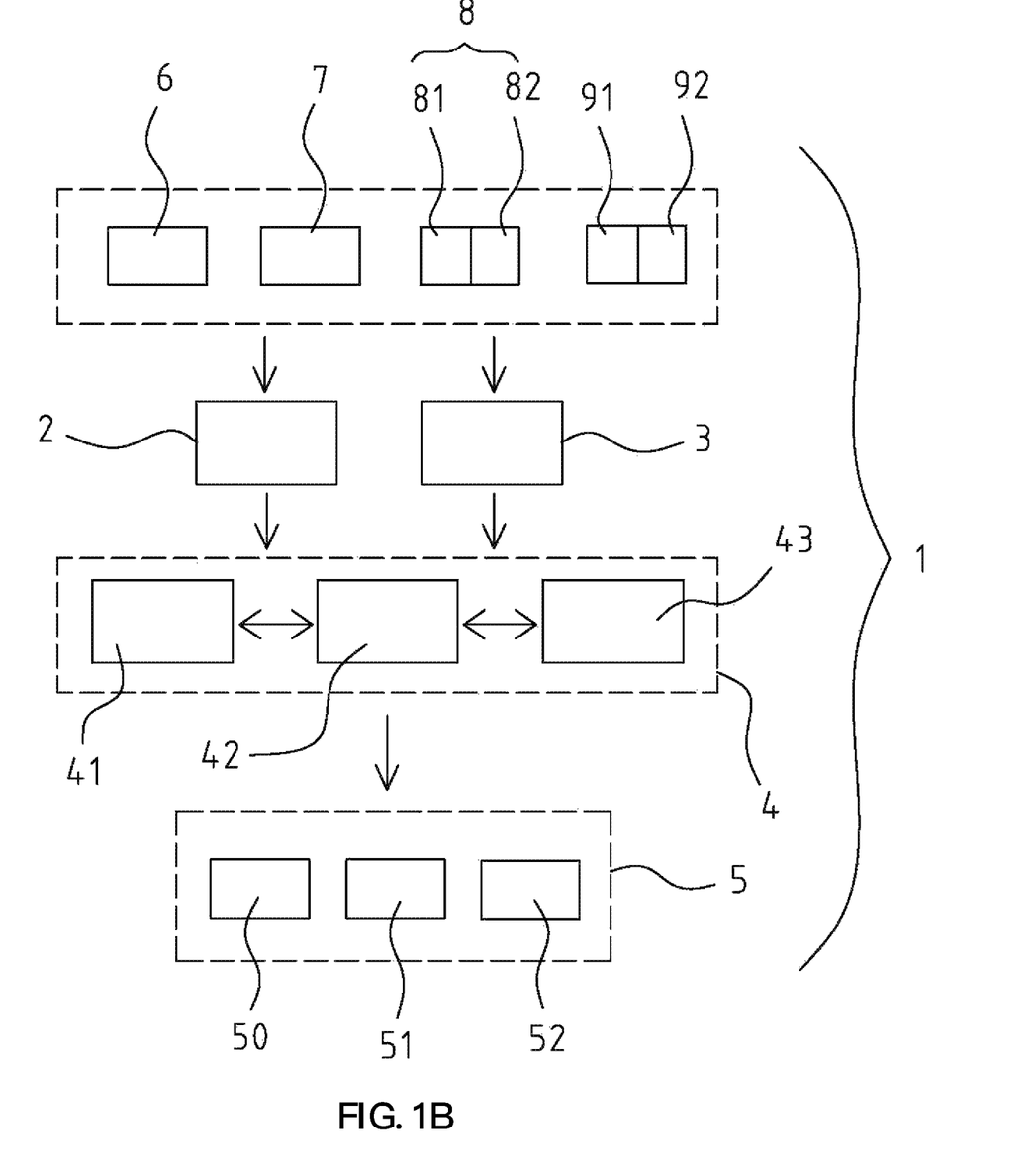
Figure 1C:
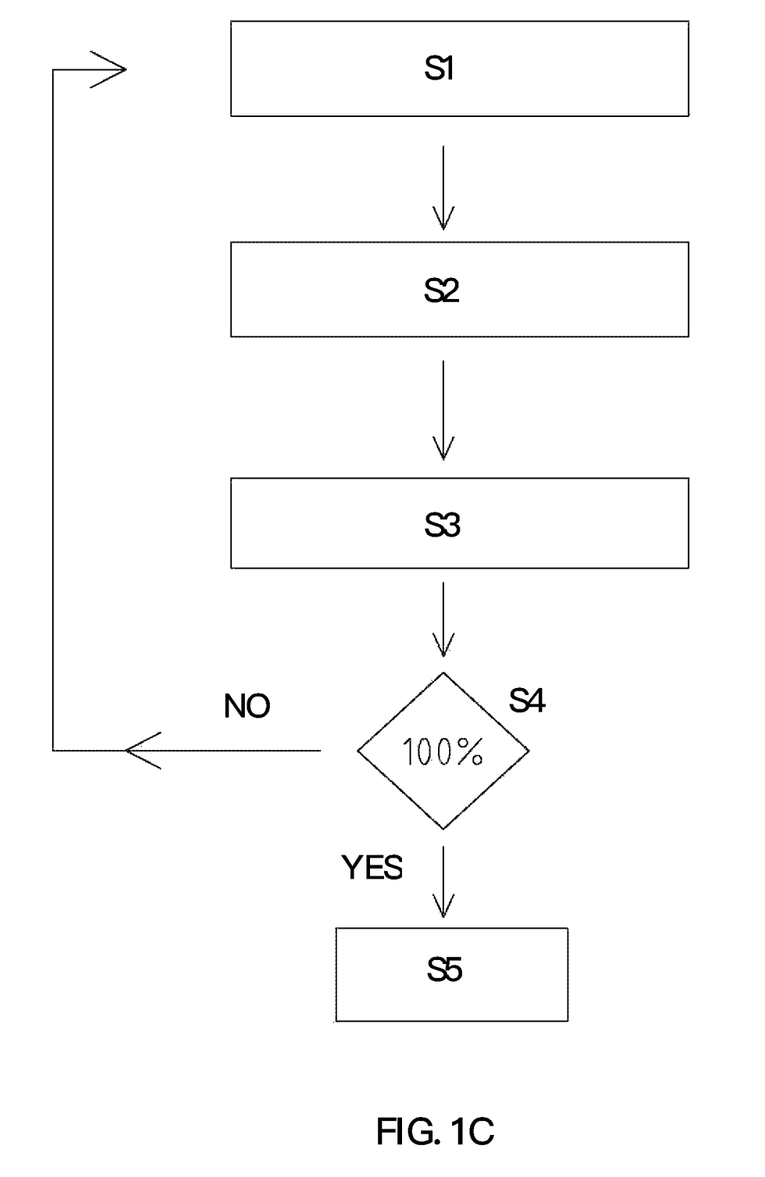
FIG. 1C is a block diagram showing an anti-scaling method of the heat exchange system in accordance with the present invention.

Referring to FIG. 1C, a block diagram that sets out an anti-scaling method of a heat exchange system in accordance with the present invention is shown. The anti-scaling method is integrated and applied to a HVAC chiller unit, an air compressor, a heat exchanger, a cooling unit, or a boiler. In step S1, operating conditions of the HVAC chiller unit, the air compressor, the heat exchanger, the cooling unit or the boiler are preset. The operating conditions may include operated water quality at a water quality limit. In step S2, water quantity and water quality of the HVAC chiller unit, the air compressor, the heat exchanger, the cooling unit, or the boiler in field operation such as amount of calcium ions and carbonate ions are simulated, and an anti-scaling treatment is treated based on water quantity and water quality of the HVAC chiller unit, the air compressor, the heat exchanger, the cooling unit, or the boiler (i.e. concentration of calcium ions and carbonate ions) simulated from that in field operation. In step S3, an anti-scaling performance is tested by a fast anti-scaling performance testing method. The fast anti-scaling performance testing method is a crystallization kinetics test method or a heat exchange test method. When the crystallization kinetics test method is used, a crystallization rate of calcium carbonates in different qualities of water is detected. A slowing-down crystallization rate thereof defines a performance of scale inhibition. For example, a growth rate $2.0*10^{-10}$ m/s of calcium carbonate crystallization decreasing down to $1.0*10^{-10}$ m/s or to $0.0*10^{-10}$ m/s means there is 50% or 100% performance of scale inhibition. When the heat exchange test method is used for the testing of the anti-scaling performance, a heat source side of the heat exchanger is heated up and reaches 2 to 12 times temperature of cooling water in field operation. In step S4, for the anti-scaling treatment non-fully treated, conditioning of the anti-scaling treatment continuously proceeds until the anti-scaling treatment of the HVAC chiller unit, the air compressor, the heat exchanger, the cooling unit, or the boiler has been well treated in field operation and no more scaling has been found (i.e. reaching 100% performance of scale inhibition). In step S5, an anti-scaling treatment device that has been checked by the anti-scaling performance test is integrated with the HVAC chiller unit, the air compressor, the heat exchanger, the cooling unit, or the boiler to provide the heat exchange system of the HVAC chiller unit, the air compressor, the heat exchanger, the cooling unit, or the boiler with the anti-scaling performance in which a 100% or designated percentage of performance of scale inhibition, or a designated reference including temperature or pressure is reached, so as to enhance operating efficiency and performance on the HVAC chiller unit, the air compressor, the heat exchanger, the cooling unit, or the boiler.

A heat exchange system in accordance with the present invention is integrated with the HVAC chiller unit, the air compressor, the heat exchanger, the cooling unit, or the boiler in use of the anti-scaling method. With reference to FIG. 1A, the heat exchange system 1 in accordance with the present invention comprises a load control unit 2, a temperature and pressure detection unit 3, a data processing unit 4 and an anti-scaling treatment unit 5. The load control unit 2 is used to control a field operation of a condenser 6, an air cooler 7 or an oil cooler, a boiler 8, or every kind of heat exchanger 91 and cooling unit 92 to satisfy preset conditions such as chilled water and brine water output temperature, air pressure, temperature and pressure at the heat source side, cooling water temperature, or steam pressure or hot water temperature of the boilers. The heat exchanger 91 and the cooling unit 92 may include but not within a refrigeration and freezing equipment, a packaged chiller unit, a chiller unit, a brine chiller unit, a heat pumps, a compressor for transportation of chilled water and brine water or refrigerant, a wastewater treatment device, an air conditioning equipment, an air compressor, an industrial furnace, etc. The boiler 8 may include a steam boiler 81 and a hot water boiler 82. The temperature and pressure detection unit 3 is used to detect in every moment the temperature and pressure of the condenser 6, the air cooler 7 or the oil cooler, the boiler 8 including the steam boiler 81 and the hot water boiler 82, the heat exchanger 91 and the cooling unit 92 in field operation. The data processing unit 4 includes a memory 41, a microprocessor 42 and an editing interface 43. The memory 41 stores data obtained by measuring the condenser 6, the air cooler 7 or the oil cooler, the boiler 8 (including the steam boiler 81 and the hot water boiler 82), the heat exchanger 91 and the cooling unit 92, and processed by the load control unit 2 and the temperature and pressure detection unit 3. The data may consist of field operating factors and simulated factors. The field operating factors include steam pressures, hot water temperatures, load conditions, cooling water quality, makeup water rate and bleed-off water rate, running EER for different temperatures, energy consumption, year-by-year disinfectant residual concentration (i.e. service demand factor). The simulated factors include simulated water quantity and water quality that has a water quality limit same as that in field operation, e.g. same concentration of calcium ions and carbonate ions, simulated running EER (or alternatively as running kw/RT or running COP, depending upon selected computing units), and simulated energy consumptions. The microprocessor 42 is used to compare the field operating factors processed by the load control unit 2 and the temperature and pressure detection unit 3 with the simulated factors prestored in the memory 41 (including the simulated water quantity and water quality that has water quality limit same as that in field operation and defined by concentration of calcium ions and carbonate ions), the simulated running EER, the simulated energy consumptions, and is used to show comparison results on terminal screens. The editing interface 43 is compatible with an external operation panel and provides output and input of the data. The anti-scaling treatment unit 5 is connected with the data processing unit 4 and is used to simulate water quality that has a water quality limit same as that in field operation to condition cooling water in the condenser 6, the air cooler 7 or the oil cooler, the heat exchanger 91 and the cooling unit 92 and boiler water in the boiler 8 (such as the steam boiler 81 and the hot water boiler 82) and to condition a scaling factor of the cooling water in the condenser 6, the air cooler 7 or the oil cooler, the heat exchanger 91 and the cooling unit 92 and the boiler water in the boiler 8 (steam boiler 81 and the hot water boiler 82). The scaling factor may be bonding ways between calcium ions and carbonate ions of calcium carbonates. The anti-scaling treatment unit 5 is integrated and applied to the HVAC chiller unit, the air compressor, the heat exchanger, the cooling unit, or the boiler by taking advantage of an anti-scaling treatment device 50 that has been checked by the anti-scaling performance test, so as to achieve an anti-scaling performance. More specifically, simulating water quality that has a water quality limit same as that in field operation by the anti-scaling treatment unit 5 refers to conditioning reference numbers in relation to degree of the combination between the calcium ions and the carbonate ions of the calcium carbonate based on water quantity and water quality in field operation for the condenser 6 of the HVAC chiller unit, the air cooler 7 or the oil cooler of the air compressor, the heat exchanger 91 and the cooling unit 92, and the pipe of the steam boiler 81, as well as based on water quality in field operation for the hot water boiler 82. Conditioning of the cooling water in the condenser 6, the air cooler 7 or the oil cooler, the heat exchanger 91 and the cooling unit 92 and of the boiler water in the boiler 8 (including the steam boiler 81 and the hot water boiler 82) refers to conditioning the designed flow rate and water quality, i.e. using higher temperature water in operation of the boiler 8 and using lower temperature water in operation of the HVAC chiller unit, the air compressor, the heat exchanger or the cooling unit. When a steam boiler 81 of the boiler 8 is in operation, softened water is used and 80-120 percent of a feedwater flow or 150-300 percent of a steam capacity is taken as a treatment flow; when a hot water boiler is in operation, semi-softened water or water having hardness lower than 200 ppm of calcium carbonate is used, and 10-80 percent of the feedwater flow or a flow modified according to water quality or a number equal to total water quantity divided by 1-24 hours is taken as the treatment flow; when the HVAC chiller unit, the air compressor, the heat exchanger and the cooling tower are in operation, 1-40 percent of the feedwater flow is taken as the treatment flow or the flow modified according to water quality. If the hardness of makeup water is higher than 200 ppm, then the formula is used in the conditioning: treatment flow*(calcium carbonate amount in makeup water hardness/200 ppm). A formula of circulating water flow rate is "tonnage of HVAC chiller unit*12.5 L/m/RT", wherein the 12.5 L/m/RT has been normalized in the CNS Standard 12575, and the RT is tonnage of refrigeration.

Further, calculation for cycle of concentration for the condenser 6, the air cooler 7 or the oil cooler, the heat exchanger 91 and the cooling unit 92, and the steam boiler 81 depends on makeup water and water quality limit. A formula for calculating the cycle of concentration for the condenser 6, the air cooler 7 or the oil cooler, the heat exchanger 91 and the cooling unit 92 is the water quality limit divided by the electrical conductivity of makeup water. For example, if the electrical conductivity of the makeup water obtained from tap water is 300 micromho with water hardness of 130 ppm and the cooling water quality limit is 2000 micromho, then the cycle of concentration would be 6.67 (2000/300=6.67). A formula of the circulating water flow rate is as follows: makeup water flow rate M=nE/(n−1); bleed-off water flow rate B=E/(n−1); wherein n is cycle of concentration; E is evaporation flow rate as a function of the tonnage of the HVAC chiller unit. Tonnage of refrigeration (RT) can be calculated by converting heat dissipating capacity of 3900 kcal/h/RT. If water vaporization heat at 30° C. is 580 kcal/kg and water density is 1 kg/L, then the evaporation flow rate E would be 3,900/580=6.724 L/h/RT per ton. When the cycle of concentration of 6.67 is substituted into the formula of makeup water flow rate M and the formula of bleed-off water flow rate B, the makeup water flow rate M comes up with M=nE/(n−1)=6.67/(6.67−1)*6.724=7.91 L/h/RT, and the bleed-off water flow rate B comes up with B=E/(n−1)=1/(6.67−1)*6.724=1.19 L/h/RT.

As above, the heat exchange system 1 of the present invention integrates interaction of those units together with the anti-scaling method of the present invention to simulate water quality that has a water quality limit same as that in field operation. For the HVAC chiller unit, the air compressor, the heat exchanger, the cooling unit, or the boiler under a variety of scaling conditions in both field operation and water quality, a testing undergoes with a fast anti-scaling performance testing method. The anti-scaling treatment device 50 is utilized for anti-scaling treatment until no more scaling formation has been found (i.e. reaching 100% performance of scale inhibition, which makes water quality of the heat exchange system 1 of the present invention no longer charged and lose the reaction power so as to prevent scaling formation. In details, if the calcium ions and the carbonate ions in water quality are not treated at all or non-fully treated, i.e. not achieving 100% performance of scale inhibition, there are still residues entering into operating equipment, resulting in the formation of calcium carbonate crystalline ($CaCO_3$ (s)) due to the existence of their electrical charge shown as formula 1 below. If the anti-scaling treatment is fully treated by the anti-scaling treatment device 50, i.e. achieving 100% performance of scale inhibition, the bonding ways between the calcium ions and the carbonate ions in water quality are conditioned to form compounds $CaCO_3^0$ as treated ionic groups shown as formula 2 below. The compounds $CaCO_3^0$ are actually no longer charged and lose their reaction power to prevent scaling formation, thereby to enhance performance of scale inhibition under different climate conditions and different running loads, which ensures the operating efficiency and performance of the HVAC chiller unit, the air compressor, the heat exchanger, the cooling unit, or the boiler. Testing of the anti-scaling performance in the process of the anti-scaling treatment of the heat exchange system in accordance with present invention can be turned into the form of designated or non-designated percentages as a running data for anti-scaling performance. Thus, the present invention is able to compare a running data of the conditioned water with the running data of the anti-scaling performance which is established after the testing of the anti-scaling performance to make manufacturing or operation of equipment equivalent to testing of the anti-scaling performance of the anti-scaling treatment for achieving a designated anti-scaling performance. Further, by the anti-scaling method of the present invention, water quality that has a water quality limit same as that in field operation is simulated to condition water quality and bonding ways between calcium ions and carbonate ions of calcium carbonates of the scaling factor, so as to ensure that a 100% or designated percentage of performance of scale inhibition, or a designated reference including temperatures or pressures need to be reached.

$$Ca^{+2}+CO_3^{-2} \rightarrow CaCO_3(s) \qquad (1)$$

$$Ca^{+2}+CO_3^{-2} \rightarrow CaCO_3^0 \qquad (2)$$

With reference to FIG. 1B, which shows a block diagram indicating the anti-scaling treatment unit 5 of the heat exchange system 1 of the present invention further includes an sterilizer 51 and an impurity separator 52, the difference between FIG. 1A and FIG. 1B is that the sterilizer 51 of FIG. 1B is connected with pipes of operation equipment, capable of killing microorganism such as phycomycetes that are born in water inside the cooling pipes. The impurity separator 52 is disposed at an inlet of an inflow pipe of operation equipment, capable of separating solid suspending impurities from cooling water in the cooling pipes to facilitate the anti-scaling treatment. It is noted that because the cooling water keeps circulating, the sterilizer 51 and the impurity separator 52 may be disposed in practice at an outlet of operation equipment or at a downstream or countercurrent site across the inlet and the outlet of operation equipment, to make the water quality remain constant so as able to achieve same anti-scaling effect for long-term operation.

Figure 2:
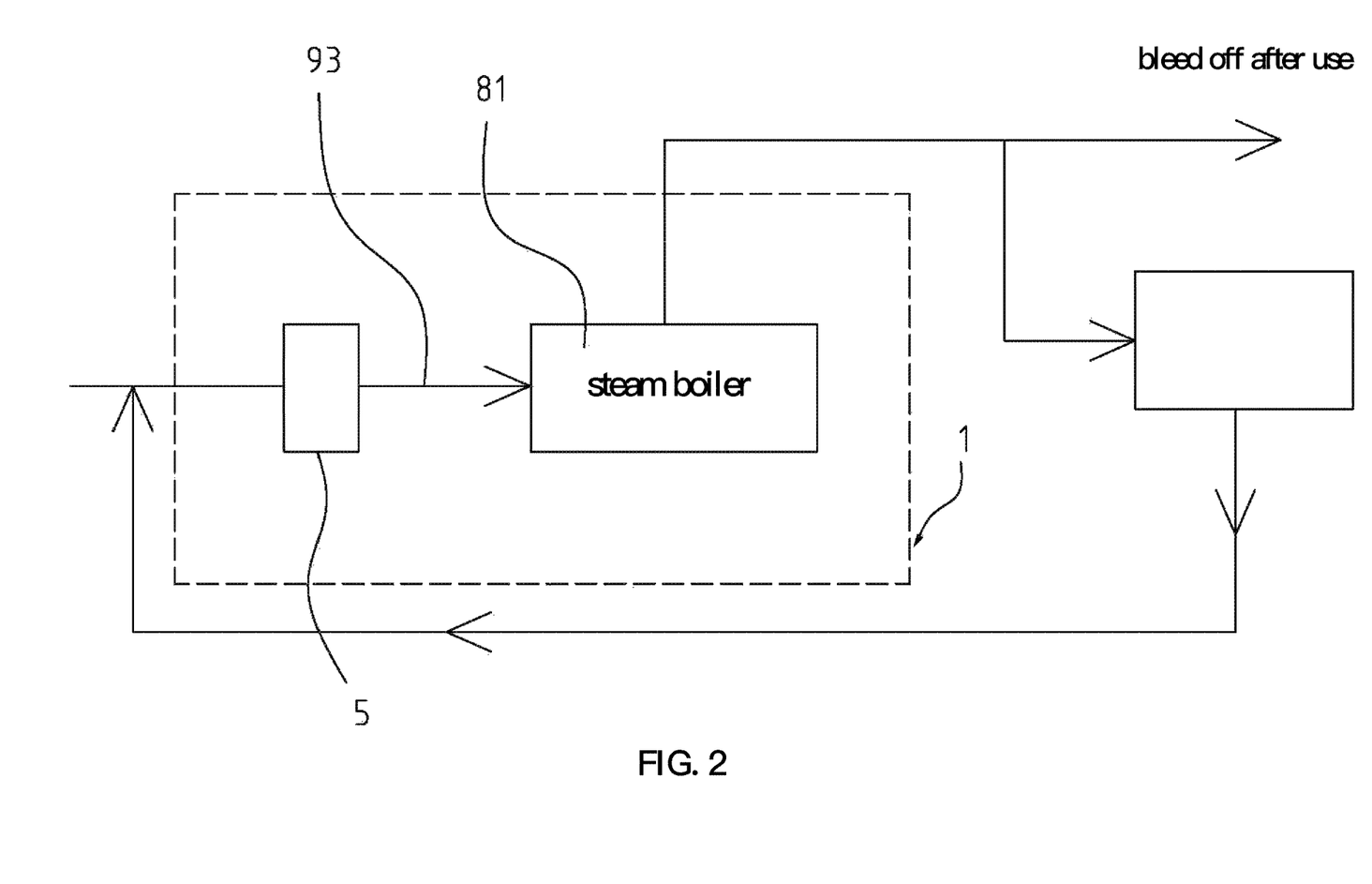
FIG. 2 is a schematic view showing the heat exchange system applies to a steam boiler in accordance with a first embodiment of the present invention.
Figure 3:
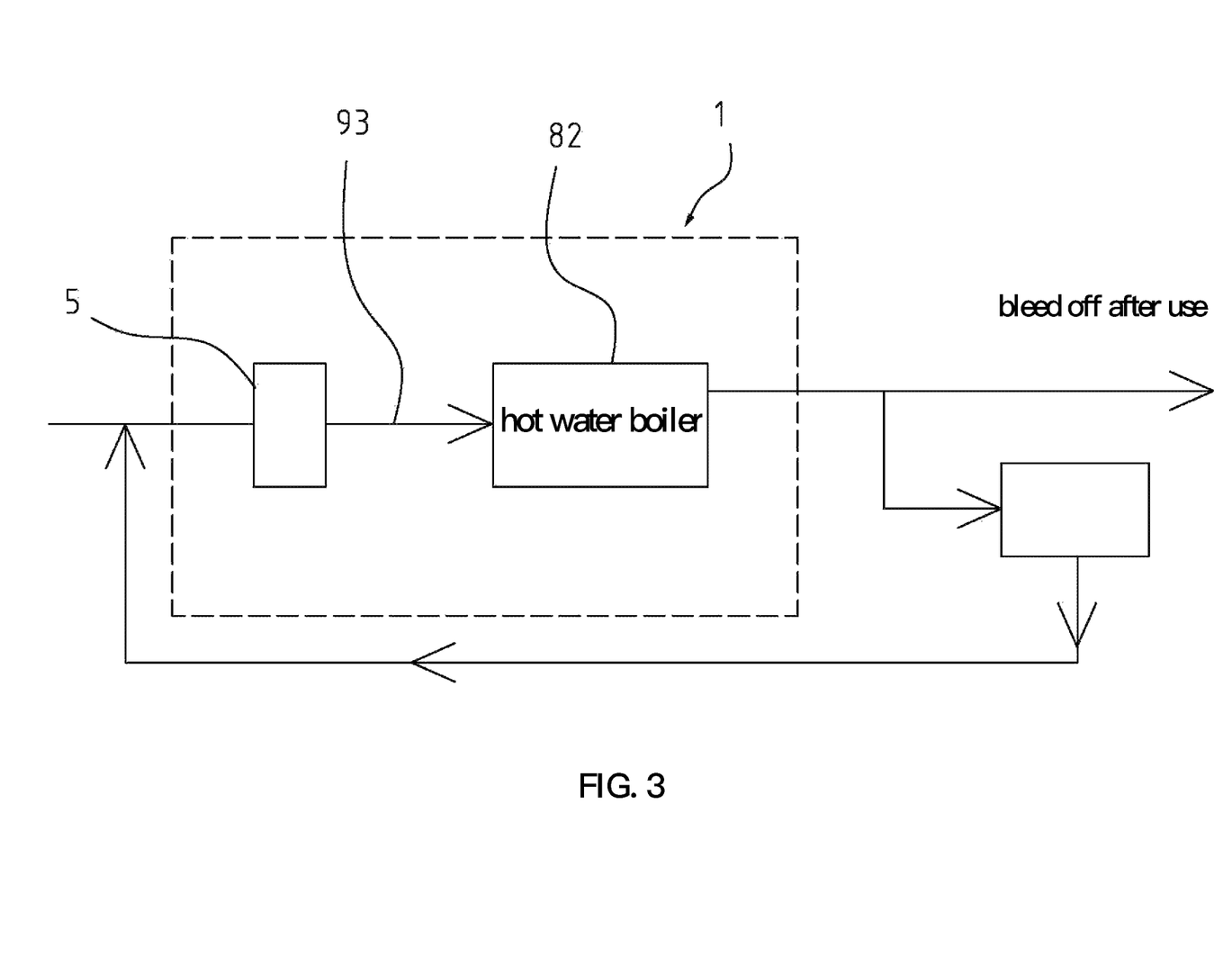
FIG. 3 is a schematic view showing the heat exchange system applies to a hot water boiler in accordance with a second embodiment of the present invention.

With reference to FIG. 2 and FIG. 3, which show schematic views of a first embodiment and a second embodiment of the present invention in which the heat exchange system 1 is applied to the steam boiler 81 and the hot water boiler 82. The conventional steam boiler 81 operates at a high temperature (100~200° C.), but causes the formation of scale due to evaporation and concentration of the water in the boiler. Instead, the present invention causes no formation of scale while operating at the same high temperature (100~200° C.). As shown in FIG. 2, when the anti-scaling treatment unit 5 of the heat exchange system 1 (including the anti-scaling treatment device 50 that has been checked by the anti-scaling performance test) integrates with and applies to the steam boiler 81, the anti-scaling treatment unit 5 is disposed at an inlet of a feed pipe 93 to integrate the steam capacity with a feed flow and the water quality, thereby to achieve the anti-scaling effect. In other words, a momentary feed flow with safety in using amount may be necessary to integrate with the steam capacity of the steam boiler 81. The momentary feed flow amount is equal to 2.5-3 times of the steam capacity of the steam boiler 81. Makeup water is thus provided in chemical treatment with even wider acceptable hardness range and allowable variation. For example, 10 ton/hour of the steam capacity of the steam boiler 81 is necessary to integrate with 25-30 ton/hr of the feed flow, and acceptable makeup water hardness is 5-50 ppm with 5 ppm as the allowable variation, for example, in the case of allowing only little variation. Therefore, the low-scaling or anti-scaling effect can be achieved by integrating the feed flow with the water quality. The heat exchange system 1 of the present invention is also suitable for boilers well controlled under boiler priming and carryover situations. In another preferable embodiment, the feed flow is 1.2-2 times of the steam capacity of the boiler, and the anti-scaling treatment unit 5 has the same feed flow equal to 1.2-2 times of the steam capacity of the boiler.

Figure 4A:
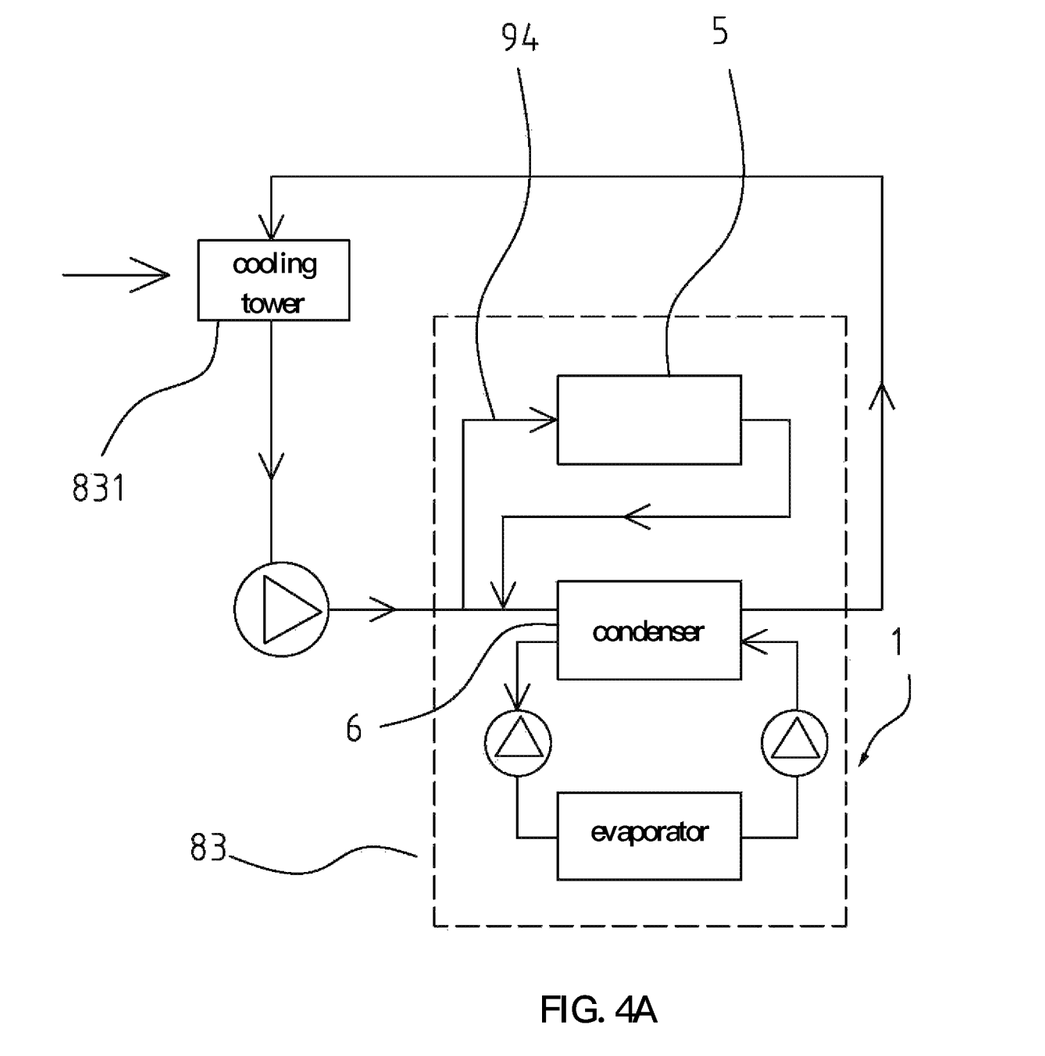
FIG. 4A and FIG. 4B are schematic views showing the heat exchange system applies to a HVAC chiller unit in an intra-pipe flow style and an exterior-pipe flow style in accordance with a third embodiment of the present invention.
Figure 4B:
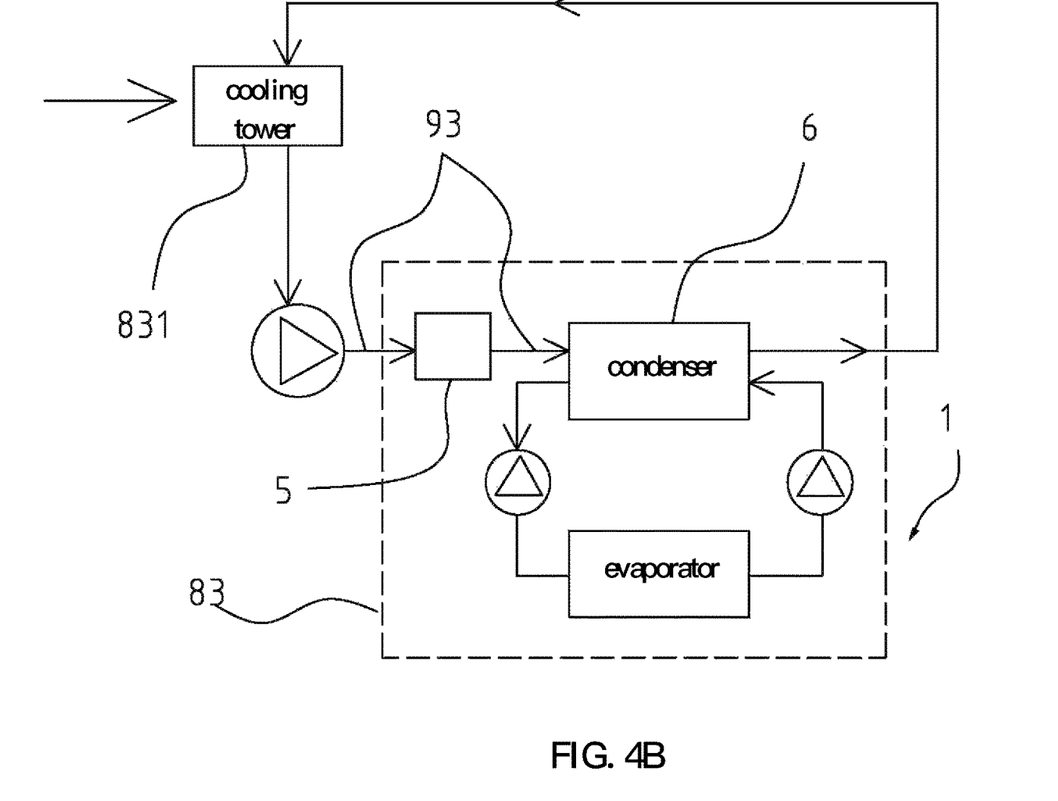

With reference to FIG. 3, when the anti-scaling treatment unit 5 of the heat exchange system 1 (including the anti-scaling treatment device 50 that has been checked by the anti-scaling performance test) integrates with and applies to the hot water boiler 82, the anti-scaling treatment unit 5 is disposed at an inlet of a feed pipe 93 and uses half-hard water or water having hardness lower than 200 ppm of calcium carbonate, and takes 30 percent of feedwater flow, or alternatively a number equal to entire water quantity of the boiler system divided by 8 hours as entire flow, wherein the entire water quantity of the boiler system refers to water quantities in the boiler as well as that in the circulating pipes, depending on practical conditions. Therefore, the low-scaling or anti-scaling effect can be achieved by integrating the feed flow with the water quality. With reference to FIG. 4A and FIG. 4B, which show schematic views of a third embodiment of the present invention, the anti-scaling treatment unit 5 of the heat exchange system 1 of the present invention that has been checked by the anti-scaling performance test integrates with and applies to the anti-scaling treatment of the HVAC chiller unit in an intra-pipe flow style and an exterior-pipe flow style. As shown, the anti-scaling treatment unit 5 is disposed at a side-stream pipe 94 (FIG. 4A) or an feed pipe 93 (FIG. 4B) of an inlet of the condenser 6 where the cooling water enters, wherein the cooling water of the HVAC chiller unit 83 from the cooling unit (e.g. the cooling tower 831) is under normal temperature condition (10-50° C.), but causes the formation of scale only if not being treated at all or not being fully treated after heat dissipation and concentration of the cooling water. The anti-scaling treatment unit 5 of the present invention is able to improve the scaling phenomenon under same normal temperature condition in operations. As shown in FIG. 4A and FIG. 4B, no matter the anti-scaling treatment unit 5 proceeds the anti-scaling treatment the HVAC chiller unit 83 in an intra-pipe flow style and an exterior-pipe flow style, the cycle of concentration of the calcium ions and the carbonate ions of calcium carbonate is 6.67 with electrical conductivity of the makeup water of 300 micromho and the water hardness of 130 ppm. For the HVAC chiller unit of 1000 RT, the makeup water flow rate is thus calculated as M=7.91 L/h/RT, and the bleed-off water hardness is calculated as L/h/RT 130*6.67=867.1 ppm.

When the running load is 100%, the makeup water flow rate would be M=7.91*1000=7,910 L/h, the inflow of the calcium hardness would be 130 mg/L*7,910=1,028.3 g/L (1 ppm=1 mg/L), the bleed-off water flow rate would be 1,185.9 L/h, and the discharging quantity of calcium hardness would be 867.1*1,185.9=1,028.3 g/L. When the running load is 80%, the makeup water flow rate would be M=7,910*80%=6,328 L/h, the inflow of the calcium hardness would be 130 mg/L*6,328=822.6 g/L, the bleed-off water flow rate would be 948.7 L/h, and the discharging quantity of calcium hardness would be 867.1*948.7=822.6 g/L. When the running load is 60%, the makeup water flow rate would be M=7,910*60%=4,746 L/h, the inflow of the calcium hardness would be 130 mg/L*4,746=617.0 g/L, the bleed-off water flow rate would be 711.5 L/h, and the discharging quantity of calcium hardness would be 867.1*711.5=617.0 g/L. By using the memory 41 of the data processing unit 4, the heat exchange system 1 of the present invention is able to prestore the bleed-off water flow rate, bleed-off water flow and changes of calcium hardness according to the calcium hardness of inlet cooling water flow. As listed in Table 1, it is noted that the change of calcium hardness is 0 when the water quality and water quantity in field operation in the present invention are simulated for conditioning. After calculated by the microprocessor 42, the bleed-off water flow rate, bleed-off water flow and calcium hardness would change in proportion along with change of the running load. The discharging quantity of calcium hardness changes along with the change of the running load as well. The bleed-off water flow is same as the inlet cooling water flow, that is, the discharging quantity of calcium hardness in the cooling water is not subject to the running load. Therefore, the low-scaling or anti-scaling effect can be achieved by integrating the feed flow with the water quality.

TABLE 1 makeup water flow rate, bleed-off water flow rate, discharging quantity of calcium hardness, and change of calcium hardness for the cooling water

| running load | makeup water flow rate M | inflow of the calcium hardness | bleed-off water flow rate B | discharging quantity of calcium hardness | change of calcium hardness |
|---|---|---|---|---|---|
| 100% | 7,910 | 1,028.3 | 1,185.9 | 1,028.3 | 0 |
| 80% | 6,328 | 822.6 | 948.7 | 822.6 | 0 |
| 60% | 4,746 | 617.0 | 711.5 | 617.0 | 0 |

Further, the sterilizer 51 is provided in the present invention to kill microorganism such as phycomycetes born in water inside the pipes. Accordingly, the memory 41 of the data processing unit 4 is used to store year-by-year disinfectant residual concentration data (i.e. service demand factor) as shown in Table 2. By using the microprocessor 42, the largest tonnage of the sterilizer 51 is calculated in terms of the weight of the HVAC chiller unit and air compressor. Therefore, the low-scaling or anti-scaling effect can be achieved by integrating the feed flow with the water quality.

TABLE 2 service demand factor of each month for disinfection dosage

| Month(s) | 7~8 | 6 ' 9 | 4 ' 5 ' 10 | 2 ' 3 ' 11 | 12 ' 1 |
|---|---|---|---|---|---|
| Assigned weight | 1 | 0.8 | 0.6 | 0.5 | 0.4 |
| Add up to 7.7 months | 2 | 1.6 | 1.8 | 1.5 | 0.8 |

It is noted that because the cooling water keeps circulating, the anti-scaling treatment unit 5 (the sterilizer 51 and the impurity separator 52) may be disposed in practice at an inlet or an outlet of the cooling pipes, or at a downstream or countercurrent site across the inlet and the outlet of the cooling pipes, to make the water quality remain constant so as able to achieve same anti-scaling effect for long-term operation.

Figure 5A:
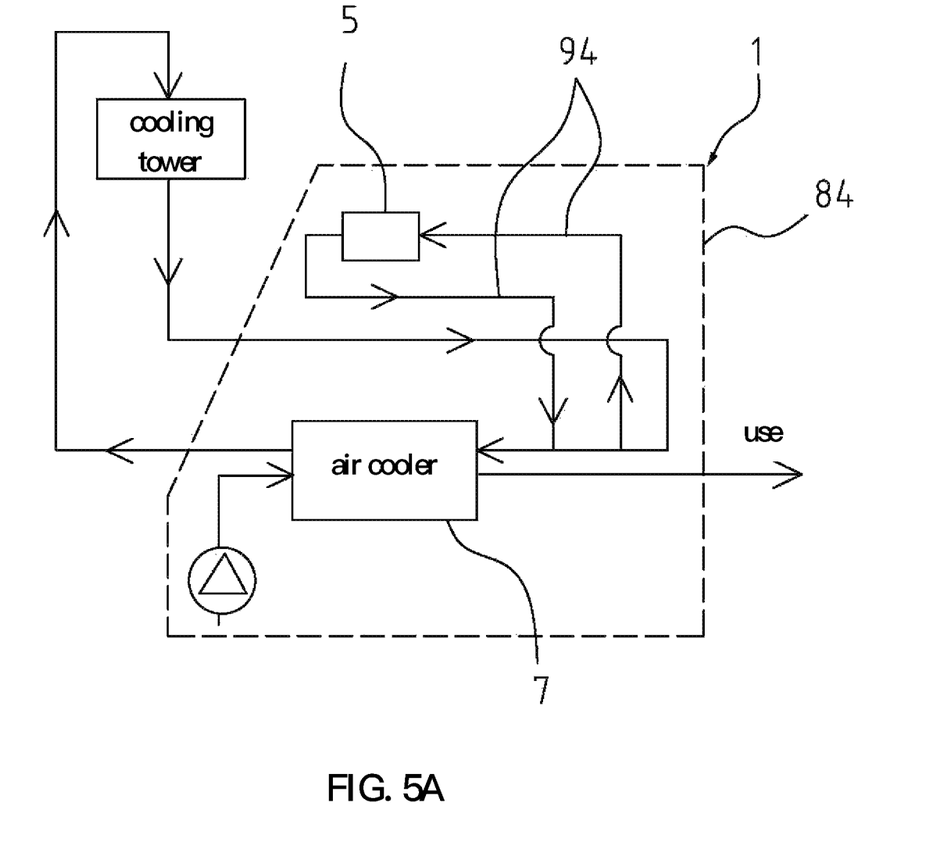
FIG. 5A and FIG. 5B are schematic views showing the heat exchange system applies to an air compressor in an intra-pipe flow style and an exterior-pipe flow style in accordance with a fourth embodiment of the present invention.
Figure 5B:
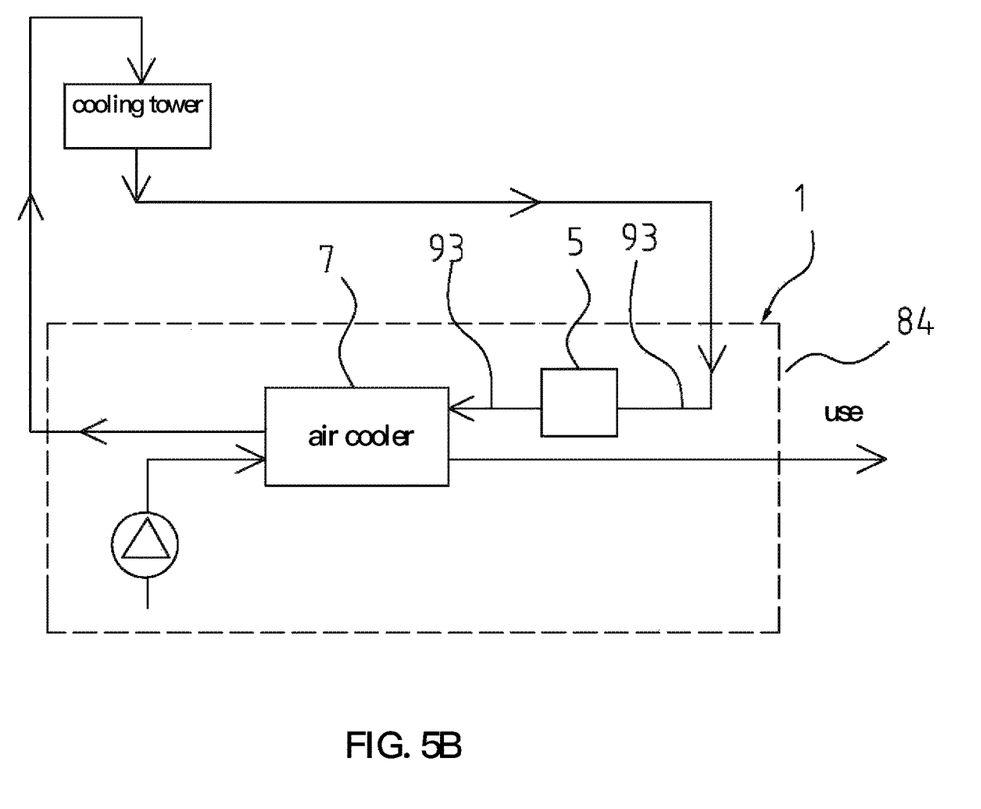

With reference to FIG. 5A and FIG. 5B, which show schematic views of a fourth embodiment of the present invention, the heat exchange system 1 applies to the air compressor in an intra-pipe flow style and an exterior-pipe flow style. As shown, no matter the heat exchange system 1 proceeds the anti-scaling treatment of the air compressor 84 in the intra-pipe flow style and the exterior-pipe flow style, the anti-scaling treatment unit 5 that has been checked by the anti-scaling performance test is integrated therewith and applied thereto. The anti-scaling treatment unit 5 is disposed at an inlet (FIG. 5A) or an inlet pipe (FIG. 5B) of the side-stream pipe 94 of the air cooler 7 (or the oil cooler, or other kinds of the heat exchanger) where the cooling water enters. In addition, the memory 41 of the data processing unit 4 as described in the third embodiment is used to pre-store the bleed-off water flow rate, bleed-off water flow and changes of calcium hardness (Table.1). After calculated by the microprocessor 42, the bleed-off water flow rate, bleed-off water flow and calcium hardness would change in proportion along with change of the running load. The discharging quantity of the calcium hardness changes along with the change of the running load as well. The bleed-off water flow is same as inlet cooling water flow so that the calcium hardness of the inlet cooling water flow is not subject to the running load. Therefore, the low-scaling or anti-scaling performance can be achieved by integrating the feed flow with the water quality. Furthermore, the memory 41 of the data processing unit 4 can store year-by-year disinfectant residual concentration data (i.e. service demand factor) as shown in Table. 2. By using the microprocessor 42, the largest tonnage of the sterilizer 51 can be calculated in terms of the weight of the HVAC chiller unit and air compressor. The low-scaling or anti-scaling performance can be achieved by integrating the feed flow with the water quality.

As described in the third embodiment and the fourth embodiment, the anti-scaling treatment unit is applied to the condenser of the HVAC chiller unit, the air cooler or the oil cooler of the air compressor. Indeed, conventional cooling devices or heat exchange devices designed for wastewater treatment or industrial furnaces must operate in use of the cooling water for purpose of temperature control. In practice, scaling problems and their inhibition and treatments of water quantity and quality may be encountered during operating processes of the cooling water. Solutions to said problems are same as what is described in the third embodiment and the fourth embodiment of the present invention. It is noted that cooling fins of the cooling devices are parts of the heat exchange devices, so surfaces of the cooling fins contact with the cooling water, which would cause scaling problems as well. However, the scaling problems can be solved by using the heat exchange system of the present invention. When the crystallization kinetics detection method is adopted as the anti-scaling method of the present invention, the growth rate $2.0*10^{-10}$ m/s of calcium carbonate crystallization down to $1.0*10^{-10}$ m/s or to $0.0*10^{-10}$ m/s means 50% or 100% performance of scale inhibition. When the heat exchange detection method is adopted as the anti-scaling method of the present invention, the heat source side of the heat exchanger is heated as 7.8 times the cooling water temperature in field operation. For example, under the conditions: cooling water input temperature 30° C., cooling water output temperature 35° C., condensing temperature of the HVAC chiller unit 36° C., the arithmetic mean temperature difference for heat transfer would be 36 (35+30)/2=3.5° C.; when the heat source side of the heat exchanger is heated as 60° C., the arithmetic mean temperature difference for heat transfer would be 60 (35+30)/2=27.5° C., wherein heat transfer rate is improved by 27.5/3.5=7.86 times. The method allows a detection for the scaling rate on surfaces of the heat exchanger. Similarly, a slowing-down scaling rate represents a performance of scale inhibition. For example, a scaling rate before the anti-scaling treatment is assumed to be 100 mg/cm$^2$/month, and after the anti-scaling treatment, the scaling rate is decreased to 40 mg/cm$^2$/month, which means the performance of scale inhibition is 60%. As the scaling rate is down to 0 mg/cm$^2$/month, the performance of scale inhibition reaches 100% which means a complete inhibition. In other words, the present invention is able to apply the available performance of scale inhibition to equipment manufactures or comparisons with other operating equipment for testing on the performance of scale inhibition for the anti-scaling treatment.

As above, the heat exchange system of the present invention is able to enhance performance of scale inhibition under different climate conditions and different running loads so as to ensure the operating performance and efficiency of the HVAC chiller unit, the air compressor, the heat exchanger, the cooling unit or the boiler. Some advantages of the present invention are listed below.

First, the present invention is to solve the problem that nowadays the related sellers have no way to know or ensure the operating performance and efficiency of the HVAC chiller unit, the air compressor, the heat exchanger, the cooling unit, or the boiler to which they apply. Thus, the present invention is to ensure the operating performance and efficiency of the HVAC chiller unit, the air compressor, the heat exchanger, the cooling unit (e.g. the cooling tower) or the boiler.

Second, the present invention is to solve the problem of the visual inspection on scaling degree identification which has disadvantage of slow and rough. That is, the present invention is thus to provide owners with a fast testing on the anti-scaling performance and to ensure the match of the purchased HVAC chiller unit, the air compressor, the heat exchanger, the cooling unit, or the boiler and their real demands, and also avoid subsequent troubles in further equipment improvement or maintenance resulted from the scaling problems.

Third, the present invention is to provide an anti-scaling performance for HVAC chiller units by providing an EER efficiency of more than 95% in an annual performance measurement according to the requirement of CNS Standard 12575, which is much better than an EER efficiency of less than 50% in conventional cases. In comparison, the degree of improvement in the present invention can be up to 95−50=45%. Since the HVAC chiller unit is known as the most energy-consuming equipment, the present invention can reasonably create extremely high industrial values for energy-saving industry.

Fourth, the present invention is to provide a low-scaling performance for the air compressor by improving the cooling effect on the air cooler to reach 8-10% in electricity consumption and improving the cooling effect on the oil cooler to reduce oil change frequency. As known, the oil change is needed whenever the oil temperature reaches 95~100° C.; and during the oil change, related machines would be shut down with decreasing gas productions, which may affect production ability and production schedule and may cause scheduling problems.

Fifth, the present invention is to provide a low-scaling performance for boilers. Conventionally, boilers are found to have obviously decreased efficiency after formation of water scaling. However, the boilers are improved in the present invention to have low-scaling performance, that is, the efficiency drops only 5-15%. The drop of only 5-15% in the efficiency is a preferable result that be taken as degree of improvement as well.

Sixth, the present invention is to enlarge the hardness range of boiler makeup water up to 10 times in its buffer capacity and the flow rate up to 50-100%. For the HVAC chiller units, the air compressors, the hardness range, the flow rate and the running load are improved as well in the present invention to reduce the complexity and difficulty in technique.

Seventh, the present invention is to provide the calculation of the largest tonnage of the sterilizer in terms of the weight of the HVAC chiller unit and air compressor, and is further to provide a load regulator to regulate the tonnage with the alternation of four seasons to reduce the complexity and difficulty in technique.

Eighth, the present invention is to open a new era by integrating the chemical engineering and hardware and software technology with the HVAC chiller unit, air compressor and boiler. Since the conventional factories use only electrical and mechanical technologies in their manufacturing processes, the present invention turns the manufacturing scope from high-scaling and high energy consumption equipment in operating processes to expand and to cover low-scaling and low energy consumption equipment.

Ninth, the present invention is to increase success rate of the anti-scaling performance and decrease the risk of being out of control. For the heat exchange system, the cooling water is utilized to decrease the risk of out of control due to the growth of microorganism, and to decrease the risk of out of control due to water scaling.

It is understood that the invention may be embodied in other forms within the scope of the claims. Thus the present examples and embodiments are to be considered in all respects as illustrative, and not restrictive, of the invention defined by the claims.

What is claimed is:

1. A heat exchange system having anti-scaling performance, integrated and applied to a condenser of a HVAC chiller, the heat exchange system comprising:
   a load controller controlling a field operation to satisfy preset operating conditions;
   a temperature and pressure detector detecting field operating temperatures and pressures; and
   an anti-scaling treater configured to achieve 100% performance of scale inhibition, wherein the anti-scaling treater is configured to condition bonding ways between calcium ions and carbonate ions of calcium carbonate, wherein the anti-scaling treater simulates water quality that has a water quality limit same as that in field operation before the anti-scaling treater is integrated and configured to the HVAC chiller, and wherein the anti-scaling treater conditions operating water by conditioning bonding ways between calcium ions and carbonate ions of calcium carbonates in accordance with simulated water quality to provide the HVAC chiller with the 100% performance of scale inhibition is reached after the anti-scaling treater is integrated and configured to the HVAC chiller.

2. The heat exchange system as claimed in claim 1, wherein the anti-scaling treater is located at an inlet or an outlet of the cooling pipes of the HVAC chiller, or at a downstream or countercurrent site across the inlet and the outlet of the cooling pipes of the HVAC chiller.

3. The heat exchange system as claimed in claim 1, wherein the conditioning refers to conditioning flow rate and water quality; wherein 1-40 percent of a feedwater flow of the HVAC chiller is taken as a treatment flow or a flow modified according to water quality; a formula of circulating water flow rate is "tonnage of HVAC chiller*12.5 L/m/RT", wherein the 12.5 L/m/RT has been normalized in the CNS Standard 12575, and the RT is tonnage of refrigeration which is calculated by converting heat dissipating capacity of 3900 kcal/h/RT.

4. The heat exchange system as claimed in claim 1, wherein the anti-scaling treater further includes a sterilizer, an impurity separator, or a combination of the sterilizer and the impurity separator, wherein the sterilizer and the impurity separator are separately connected with the cooling pipes.

5. The heat exchange system as claimed in claim 1, wherein the anti-scaling performance test is conducted by:
   a crystallization kinetics test method including monitoring the crystallization growth rate of the calcium carbonates; or
   a heat exchange test method including heating up a heat source side of the HVAC chiller to reach 2 to 12 times temperature of cooling water in field operation.

6. A heat exchange system having anti-scaling performance, integrated and applied to a condenser of a HVAC chiller, the heat exchange system comprising:
   a load controller controlling a field operation to satisfy preset operating conditions;
   a temperature and pressure detector detecting field operating temperatures and pressures;
   a data processor including a memory, a microprocessor and an editing interface, the memory storing data processed by the load controller and the temperature and pressure detector, the data consisting of field operating factors and simulated factors, the field operating factors including steam pressures, hot water temperatures, load conditions, cooling water quality, makeup water rate and bleed-off water rate, running EER for different temperatures, and energy consumption, the simulated factors including simulated water quantity and water quality that has a water quality limit same as that in field operation (same concentration of calcium ions and carbonate ions); the microprocessor comparing the field operating factors processed by the load controller and the temperature and pressure detector and the simulated factors prestored in the memory (simulated water quantity and quality having same concentration of calcium ions and carbonate ions): in field operation, a simulated running EER, a simulated energy consumption, and showing comparison results on terminal screens; and the editing interface being compatible with an external operation panel and providing output and input of the data;
   an anti-scaling treater connected with the data processor and configured to achieve 100% performance of scale inhibition, wherein the anti-scaling treater is configured to condition bonding ways between calcium ions and carbonate ions of calcium carbonate, wherein the anti-scaling treater simulates water quality that has a water quality limit same as that in field operation before the anti-scaling treater is integrated and configured to the HVAC chiller, and wherein the anti-scaling treater conditions operating water by conditioning bonding ways between calcium ions and carbonate ions of calcium carbonates in accordance with simulated water quality to provide the HVAC chiller with the 100% performance of scale inhibition is reached after the anti-scaling treater is integrated and configured to the HVAC chiller.

7. The heat exchange system as claimed in claim 6, wherein the conditioning refers to conditioning flow rate and water quality; wherein 1-40 percent of a feedwater flow of the HVAC chiller is taken as a treatment flow or a flow modified according to water quality; a formula of circulating water flow rate is "tonnage of HVAC chiller*12.5 L/m/RT", wherein the 12.5 L/m/RT has been normalized in the CNS Standard 12575, and the RT is tonnage of refrigeration which is calculated by converting heat dissipating capacity of 3900 kcal/h/RT.

8. The heat exchange system as claimed in claim 6, wherein the anti-scaling treater is located at an inlet or an outlet of the cooling pipes of the HVAC chiller, or at a downstream or countercurrent site across the inlet and the outlet of the cooling pipes of the HVAC chiller.

9. The heat exchange system as claimed in claim 6, wherein the anti-scaling performance test is conducted by:
   a crystallization kinetics test method including monitoring the crystallization growth rate of the calcium carbonates; or
   a heat exchange test method including heating up a heat source side of the HVAC chiller to reach 2 to 12 times temperature of cooling water in field operation.

10. A heat exchange system having anti-scaling performance, integrated and applied to a condenser of a HVAC chiller, the heat exchange system comprising:
   a load controller controlling a field operation of the condenser to satisfy preset operating conditions including chilled water and brine water output temperature, air pressure, temperature and pressure at a heat source side, or cooling water temperature;
   a temperature and pressure detector detecting the temperatures and pressures of the condenser in field operation;
   an anti-scaling treater configured to achieve 100% performance of scale inhibition, wherein the anti-scaling treater is configured to condition bonding ways between calcium ions and carbonate ions of calcium carbonate, wherein the anti-scaling treater simulates water quality that has a water quality limit same as that in field operation before the anti-scaling treater is integrated and configured to the HVAC chiller, and wherein the anti-scaling treater conditions operating water by conditioning bonding ways between calcium ions and carbonate ions of calcium carbonates in accordance with simulated water quality to provide the HVAC chiller with the 100% performance of scale inhibition is reached after the anti-scaling treater is integrated and configured to the HVAC chiller.

11. The heat exchange system as claimed in claim 10, wherein the anti-scaling performance test is conducted by:
   a crystallization kinetics test method including monitoring the crystallization growth rate of the calcium carbonates; or
   a heat exchange test method including heating up a heat source side of the HVAC chiller to reach 2 to 12 times temperature of cooling water in field operation.

12. A heat exchange system having anti-scaling performance, conditioning a scaling factor of water in a HVAC chiller, characterized in that:
   the heat exchange system includes an anti-scaling treater configured to achieve 100% performance of scale inhibition, where the anti-scaling treater is configured to condition bonding ways between calcium ions and carbonate ions of calcium carbonate, wherein the anti-scaling treater simulates water quality that has a water quality limit same as that in field operation before the anti-scaling treater is integrated and configured to the HVAC chiller, and wherein the anti-scaling treater conditions operating water by conditioning bonding ways between calcium ions and carbonate ions of calcium carbonates as the scaling factor in accordance with simulated water quality to provide the HVAC chiller with the 100% performance of scale inhibition is reached after the anti-scaling treater is integrated and configured to the HVAC chiller.

13. The heat exchange system as claimed in claim 12, wherein the anti-scaling performance test is conducted by:
   a crystallization kinetics test method including monitoring the crystallization growth rate of the calcium carbonates; or
   a heat exchange test method including heating up a heat source side of the HVAC chiller to reach 2 to 12 times temperature of cooling water in field operation.

14. A heat exchange system having anti-scaling performance, conditioning a scaling factor of water in a HVAC chiller, characterized in that:
   the heat exchange system includes an anti-scaling treater configured to achieve 100% performance of scale inhibition, wherein the anti-scaling treater is configured to condition bonding ways between calcium ions and carbonate ions of calcium carbonate, wherein the anti-scaling treater simulates water quality that has a water quality limit same as that in field operation before the anti-scaling treater is integrated and configured to the HVAC chiller, and wherein the anti-scaling treater conditions operating water by conditioning bonding ways between calcium ions and carbonate ions of calcium carbonates as the scaling factor in accordance with simulated water quality to provide the HVAC chiller with the 100% performance of scale inhibition is reached after the anti-scaling treater is integrated and configured to the HVAC chiller;
   wherein, when the anti-scaling treater is integrated and configured to the HVAC chiller, a running data of water conditioned by the anti-scaling treater is compared with a running data of the anti-scaling performance of the anti-scaling treater to make the HVAC chiller have an anti-scaling performance equivalent to the anti-scaling performance of the anti-scaling treater.

15. The heat exchange system as claimed in claim 14, wherein the anti-scaling performance test is conducted by:
   a crystallization kinetics test method including monitoring the crystallization growth rate of the calcium carbonates; or
   a heat exchange test method including heating up a heat source side of the HVAC chiller to reach 2 to 12 times temperature of cooling water in field operation.

\* \* \* \* \*